US006267501B1

(12) United States Patent
Wand et al.

(10) Patent No.: US 6,267,501 B1
(45) Date of Patent: Jul. 31, 2001

(54) AMBIENT TEMPERATURE MICRO-BOLOMETER CONTROL, CALIBRATION, AND OPERATION

(75) Inventors: Martin A. Wand; Kenneth Rachels, both of Plano; John F. Brady, Richardson; Michael Weinstein, Plano; David D. Ratcliff, Richardson, all of TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/283,274

(22) Filed: Apr. 1, 1999

Related U.S. Application Data

(60) Provisional application No. 60/123,171, filed on Mar. 5, 1999.

(51) Int. Cl.$^7$ .............................. G01J 5/20; H04N 5/217
(52) U.S. Cl. ..................... 374/124; 374/128; 374/129; 374/133; 374/2; 250/349; 348/164; 348/243; 348/250; 348/298
(58) Field of Search ................................. 374/124, 128, 374/129, 133, 2; 250/252.1, 349, 370.08, 338.4; 348/241, 243, 308, 164, 250, 294, 297, 298

(56) References Cited

U.S. PATENT DOCUMENTS

| 4,635,126 | * | 1/1987 | Kinoshita | ............................. | 348/297 |
| 5,109,277 | * | 4/1992 | James | .................... | 374/141 |
| 5,118,943 | | 6/1992 | Le Bars et al. | ...................... | 250/332 |
| 5,196,703 | | 3/1993 | Keenan | ............................... | 250/332 |
| 5,420,419 | | 5/1995 | Wood | ............................... | 250/338.4 |

(List continued on next page.)

FOREIGN PATENT DOCUMENTS 10122956   5/1998 (JP).

*Primary Examiner*—Diego Gutierrez
*Assistant Examiner*—Stanley J. Pruchnic, Jr.
(74) *Attorney, Agent, or Firm*—Baker Botts L.L.P.

(57) ABSTRACT

A method for measuring the temperature of a scene using a detector having at least one reference pixel, with an integratable sampling circuit associated with each pixel. Initially, an ambient reference temperature is observed with the reference pixel(s) to provide a parameter, generally voltage, indicative of that temperature to provide a constant voltage output indicating that temperature by varying the sampling circuit integration time. Each non-reference pixel is exposed to different scene and ambient temperatures and the integration time for each set of data for each pixel is recorded. For each pixel, an equation is provided relating integration time to pixel voltage when the ambient temperature and the scene temperature are the same to correct for offsets and an equation is provided relating integration time and offset corrected pixel value to the difference between the ambient temperature and the scene temperature when the ambient temperature and scene temperature differ for correction of responsivity. An equation is provided relating integration time to ambient temperature for calculating ambient temperature. The voltage level for each of the pixels and the integration is determined, the offset correction for each pixel is calculated based upon the integration time and the offset correction is applied to the pixel value for each pixel. The responsivity corrected value is calculated for each pixel based upon the integration time and the offset corrected pixel value. The ambient temperature is calculated based upon the integration time and the temperature difference between the ambient temperature and the scene temperature for each pixel which is calculated based upon the responsivity corrected pixel value using a scale factor determined during calibration. The ambient temperature and the difference between the ambient and the scene temperatures are added to obtain the actual scene temperature.

16 Claims, 1 Drawing Sheet

U.S. PATENT DOCUMENTS

| | | | | |
|---|---|---|---|---|
| 5,665,959 | * | 9/1997 | Fossum et al. | 250/208.1 |
| 5,717,608 | * | 2/1998 | Jensen | 374/128 |
| 5,756,999 | * | 5/1998 | Parrish et al. | 250/338.4 |
| 5,965,892 | * | 10/1999 | Tanaka | 250/370.08 |
| 6,011,257 | * | 1/2000 | Endoh | 250/252.1 |
| 6,028,309 | * | 2/2000 | Parrish et al. | 250/252.1 |
| 6,031,217 | * | 2/2000 | Aswell et al. | 250/208.1 |
| 6,115,065 | * | 9/2000 | Yadid-Pecht et al. | 348/308 |
| 6,130,713 | * | 10/2000 | Merrill | 348/308 |

* cited by examiner

AMBIENT TEMPERATURE MICRO-BOLOMETER CONTROL, CALIBRATION, AND OPERATION

CROSS REFERENCE TO RELATED APPLICATIONS

This application is related to Provisional Application No. 60/123,171, filed Mar. 5, 1999 for AMBIENT TEMPERATURE MICRO-BOLOMETER CONTROL, CALIBRATION, AND OPERATION, the contents of which are incorporated herein by reference and under which priority is claimed under 35 U.S.C. 119(e).

FIELD OF THE INVENTION

This invention relates to a system and method for control and operation of an ambient temperature detector, principally used in conjunction with detection of infrared radiation.

BACKGROUND AND BRIEF DESCRIPTION OF THE PRIOR ART

Prior art detectors, primarily for detection of infrared radiation, generally fall into the classes of cooled detectors (those which are generally cryogenically cooled to 77 degrees Kelvin) and ambient temperature detectors which generally operate at a particular temperature which is in the vicinity of normal room temperature. The prior art ambient temperature detectors generally require a very accurate thermoelectric cooler (TEC) servo controller to maintain a very accurate single temperature of the detector. The detector is then calibrated at this temperature and the responsivity and offsets of the detector are also corrected at this temperature, resulting in a much more predictable situation. A problem with maintenance of the detector at a constant ambient temperature is the requirement of large amounts of power by the servo loop to maintain this constant temperature and costly operation in general. Other prior art detectors use a chopper, or method of interrupting scene information to compensate for drifts. This approach has cost and size penalties.

SUMMARY OF THE INVENTION

In accordance with the present invention, the above described deficiencies of the prior art are minimized and there is provided a detector, primarily for use in conjunction with infrared radiation, which is capable of operation over a wide temperature and resistance range without the use of thermoelectric coolers (TECs) or choppers. The detector in accordance with the present invention can process the data to permit a reasonable picture to be obtained with non-uniformities corrected and also with the capability of making radiometric measurements from each of the pixels despite the fact that nothing is controlled as to actual temperature at each pixel. This allows for a relatively inexpensive video chain based upon software rather than hardware and without the necessity of customized integrated circuits.

In accordance with the present invention, the servo of the prior art ambient temperature detector is eliminated and there is provided a temperature controlled chamber wherein the ambient temperature in which the detector and the electronics are operating are controlled and which allows the detector to operate over a wide temperature range and resistance range. The system looks through the wall of the chamber to a scene which is isothermal across the scene and this temperature is presented to all of the detectors simultaneously. A two dimensional array of scene temperatures and ambient temperatures is provided and, for each point, a measurement is made at each pixel. For offset correction, points are taken where the scene and the environmental temperature are the same and an equation is provided for each pixel which allows for offset correction for each pixel when the ambient temperature is the same as that measured. For responsivity correction, points are taken where the scene temperature and the environmental temperature are different. An equation is provided for each pixel which allows for responsivity correction for each pixel.

Since the sensing element in the detector is a resistor whose value changes with temperature, it is possible to apply the control, calibration and interface techniques used in this invention to other areas requiring the precise measurement of resistance values. Specifically, the techniques described in accordance with the present invention permit simultaneous sampling of multiple resistance values (or related parameters) with a minimum of dedicated hardware per resistive element. Furthermore, the calibration and control techniques permit operation over a wide parametric, operational and environmental range while maintaining calibration and without saturating the sampling and readout circuitry. The resistive element is preferably based upon amorphous silicon microbolometer-based technology which provides high sensitivity without the use of TECs for temperature stabilization and without the use of a chopping mechanism.

Each pixel of the array comprises a resistor, preferably of amorphous silicon, whose value changes with temperature, and circuitry to sample the resistor value at the time of sampling through a capacitive discharge technique. The data from the pixel array is then read out through an n:1 multiplexer. The task is to control analog sampling of the pixel data (resistance value), read the value and correct the data for offset and gain to ultimately compute the temperature. In the process, calibration data relating raw pixel data to temperature in a controlled environment is collected and post-processed and then used in real-time by the electronics to translate the raw pixel data into temperature in a dynamic operational environment.

In operation, the calibration takes place by initially operating the system detector such that a reference pixel(s) observes an ambient reference temperature source and the sampling circuit associated with each reference pixel maintains a constant voltage output from the reference pixel(s) (this voltage can be from a single pixel or the average voltage from a number of pixels) by varying the integration time of the sampling circuit. The integration time is the input variable that will be used in the equations for offset and responsivity correction. The detector of the system is then exposed to various ambient temperatures and various scene temperatures and the data is recorded from each pixel for the integration time associated with each set of data at each ambient temperature and scene temperature. The integration time is always controlled by a servo controller. An equation is then provided for each pixel that relates integration time to pixel value when the ambient temperature and the scene temperature are the same which is used for correction of offsets. An equation is provided for each pixel that relates integration time and offset corrected pixel value to the difference between the ambient (substrate) temperature and the scene temperature when the ambient temperature and the scene temperature are different and is used for correction of responsivity. An equation is provided that relates integration time to ambient temperature and is used for calculating substrate temperature. Each of these equations is determined and stored (or the coefficients of these equations are determined and stored) into the system for use during operation.

To improve the quantization, the integration time for all cycles is not necessarily equal, but rather can switch between the two quantization steps between which the floating point integration time value falls.

If the voltage accumulated from each of the integration cycles is equally weighted in its effect on the resulting pixel voltage, the following scenario is valid:

1. The desired integration time is n+m clock cycles where n is an integer and 0<=m<1. The time represented by n clock cycles is $T_n$, The time represented by n+1 clock cycles is $T_{n+1}$.
2. The total number of integration cycles is i.
3. Compute the switch point, s, as the integration cycle where the switch is made between n and n+1 clock cycles. s=integer(i*(1−m)).
4. Integrate for n clock cycles, s times.
5. Integrate for n+1 cycles, i−s times.

$$t^{ideal}_{inj\ execute} = \frac{1}{i}\left(\sum_{j=1}^{s} T_n + \sum_{j=s+1}^{i} T_{n+1}\right)$$

It has been determined that the first integration cycle and the $i_{th}$ integration cycle are not equally weighted in their effect on the pixel data in the above scenario. It is important whether the n-clock cycles come first or last and whether the different length integration cycles are intermixed. In other words, the order of the integration cycles is very important. Regardless of the order, the value of s is not a simple linear relationship as expressed above.

Even though the relationship is not as simple as the above example, the concept is valid. It is possible to develop a relationship that yields s as a function of m that linearly approximates time quantization less than one clock cycle. This relationship can be developed theoretically or can be determined experimentally. The procedure to experimentally determine this relationship is as follows:

1. Run the integration time loop using the linear relationship above to compute s.
2. Assure that the substrate temperature is changing slowly so that n is slowly stepping (it is an integer) and the integration time loop is executed several times for each value of n.
3. Record the values of s while the substrate temperature and n continue to change slowly.
4. Generate a histogram of the values of s with i bins, i.e. one bin for each possible value of s. The peaks of the histogram indicate the values of s that occur more often. This indicates the region within one clock cycle where the reference pixel value is more sensitive to changes in s.
5. Generate the distribution curve of the histogram. This curve increases from 0 to 1 vertically as s increases from 0 to i horizontally.

With this distribution curve available during operation, instead of computing s as a linear function of m, map m onto the vertical axis of the distribution curve and read $s_l$ (linearized) from the horizontal axis. This mapping adjusts the gain in computing s based upon the sensitivity of the reference pixel value to a change in s.

The operating scenario is now changed slightly.

The desired integration time is n+m clock cycles where n is an integer and 0<=m<1. The time represented by n clock cycles is $T_n$. The time represented by n+1 clock cycles is $T_{n+1}$. The total number of integration cycles is i. Compute the linearized switch point, $s_l$, as the integration cycle where the switch is made between n and n+1 clock cycles. $s_l$=mapping of m through the distribution curve. Integrate for n clock cycles, $s_l$ times. Integrate for n+1 clock cycles, i−$s_l$, times.

When equal weighting of the integration cycles was assumed, s was computed very simply and $t_{integrate}$ was expressed as the inverse of this computation. When the distribution curve is used to determine $s_l$, the inverse of the computation is not so easily expressed. This is not an implementation problem since it is not necessary to compute $t_{integrate+}$ as a function of $s_l$ in any event since $t_{integrate}$ is the input to the operation that determines the proper values of n and $s_i$.

$s_l$=linearized switch point=mapping of m through distribution curve $t_{integrate}$=f($T_n$, $T_{n+1}$, i, $s_i$·distribution curve)

This modified scenario for generating the integration time was used while recording s as computed using the linear relationship between m and s from the first scenario. The histogram of s is almost uniform. This indicates that the "subclock" quantization is indeed being realized because the values of m progress uniformly with no apparent preference to specific ranges.

Switching between the two integration times and mapping through the distribution curve results in a significant improvement in the quantization. The quantization improvement is the inverse of the slope of the distribution curve for any value of m. If the distribution curve is linear, the slope is 1/i (distribution changes from 0 to 1 while the switch point changes from 0 to i) for all values of m. In this case, the quantization improvement is uniform by a factor of i and mapping through the distribution curve is unnecessary. If the distribution curve is not linear, the quantization improvement may be different for each value of m. In the current implementation, the quantization ranges from 0.4i to 3i over the full range of switch points.

The above scenarios show integrating for n clock cycles first, then for n+1 clock cycles last. This is not a requirement. These can be interchanged or interlaced in many ways. The important thing is that however the two integration times are mixed while collecting the data to generate the distribution curve, the same procedure must be used after the distribution curve is implemented. Neither way is necessarily better than the other, but each will result in a different distribution curve. Through experimentation, it should be possible to identify the method that results in the greatest minimum quantization improvement. Of course, the greatest minimum quantization improvement realizable is when the distribution curve is linear.

The system is operated to maintain a constant voltage output from the reference pixel(s) by varying the integration time. The voltage level of each pixel and the integration time associated with those pixel values are collected. The offset correction is calculated for each pixel based upon the integration time using the equation created during calibration for correction offsets with the corrections being applied or added to the pixel values when in operation in a standard manner. The responsivity corrected pixel value is calculated for each pixel based upon the integration time and the offset corrected pixel value using the equation provided during calibration (through determination of appropriate coefficients) for correction of responsivity. If radiometric information is desired, the ambient (substrate) temperature is calculated based upon the integration time. The temperature difference between the substrate and the scene for each pixel is calculated based upon the responsivity corrected pixel value using a scale factor determined during calibration. The two temperatures (substrate temperature and temperature difference between the substrate and the scene) are added to obtain the scene temperature.

DESCRIPTION OF THE PREFERRED EMBODIMENT

Figure 1A:
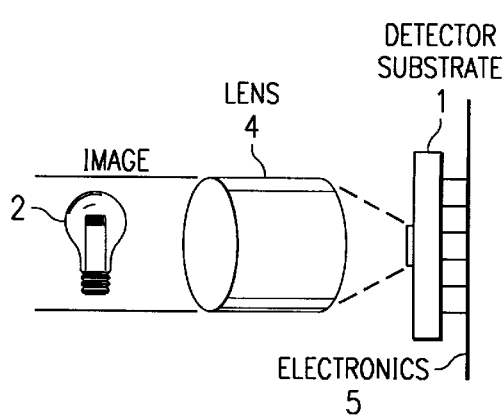
FIG. 1a is a schematic diagram of an uncooled detector system in accordance with the present invention.

With reference to FIG. 1a, there is shown a typical detector system and associated optics as used in accordance with the present invention as well as in the prior art. There is shown an image 2 which is being detected by a lens system 4 and focussed onto a detector 1, the detector including a plurality of pixels 3 with associated electronics 5 as shown and as will be discussed in connection with FIG. 2a. The resistive portion 9 (FIG. 4) of each of the pixels 3 is coupled to and generally spaced from the electronics 5 by a support structure 10 to maximize thermal isolation between the resistive portion 9 and the substrate containing the electronics 5 as will be explained in more detail hereinbelow.

Figure 2A:
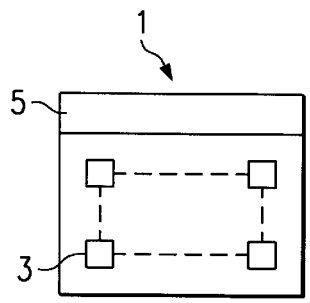
FIG. 2a is a top view of a pixel array with associated electronics in accordance with the present invention.
Figure 2B:
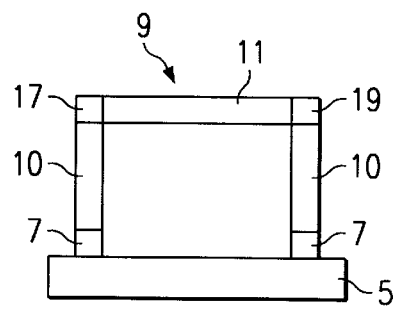
FIG. 2b is a cross sectional view of a pixel in accordance with the present invention.
Figure 3:
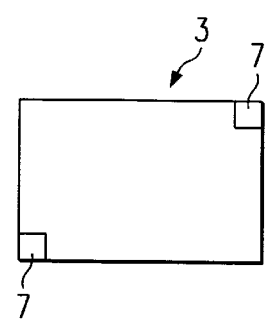
FIG. 3 is a top view of a pixel in accordance with the present invention with the resistive element removed.
Figure 4:
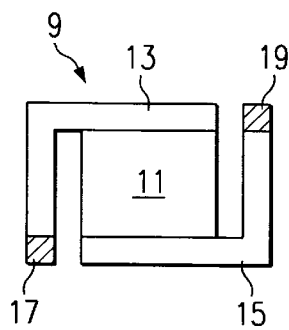
FIG. 4 is a top view of the resistive element of a pixel.

The detector 1 comprises a plurality of unit cells 3, each unit cell having a pixel. The detector also includes readout circuitry 5 in the form of an integrated circuit which can include the unit cells thereon as shown in FIG. 2a. Each unit cell 3 includes a pair of bond pads 7 as shown in FIG. 3 to which a bolometer in the form of an amorphous resistor as shown in FIG. 4 is coupled. The resistor 9 generally rests above and spaced from the semiconductor substrate to provide thermal insulation from the substrate with the spacers, which are electrically conductive, also coupling the end points of the resistor to bond pads or the like on the substrate. The spacers can be in the form of a spiral or straight beam to provide additional thermal isolation between the substrate and the resistor. The major portion of the resistance of resistor 9 is measured across the portion of amorphous silicon 11, which is coupled to the electrically conductive arms 13 and 15. The terminal portions 17, 19 of the arms 13, 15 are coupled to one of the bond pads 7 via the support structure 10 or other connector. The temperature rise of the resistor 9 is generally greater than $1 \times 10^7$ degrees C./watt due to the thermal isolation that occurs due to the support legs composed of the spiral or other appropriately shaped structure. A resistor of this type is shown in U.S. Pat. Nos. 5,021,663 and 5,288,649, the contents of which are incorporated herein by reference.

In operation, the voltage is measured across resistor 9 and this is biased with a constant voltage source and the resultant current is allowed to discharge capacitor 21 for the servo-controlled integration time. At the end of the integration time, the final voltage on each capacitor is measured.

Figure 1B:
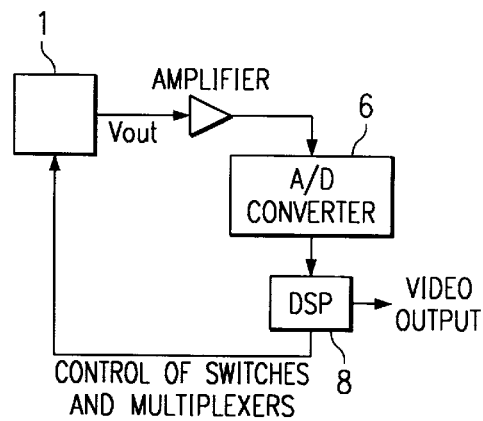
FIG. 1b is a schematic diagram of the electronics of the diagram of FIG. 1.

The most simple algorithmic approach for reading the pixel data is to amplify the pixel data in the detector 1 as shown in FIG. 1b and convert the data through an analog-to-digital converter 6. This assumes that sufficient signal is present and that the isolation between the value being converted and the remainder of the circuitry is sufficient to keep the noise at an acceptable level. This method also permits sampling of each pixel in turn rather than synchronizing pixel sampling so that the pixels are effectively sampled simultaneously. Simultaneous sampling of all pixels requires the use of a sample and hold device or an analog-to-digital converter on each pixel. An analog-to-digital converter per pixel is cost prohibitive and impractical relative to a sample-and-hold circuit for each pixel as provided in accordance with the present invention.

Figure 5:
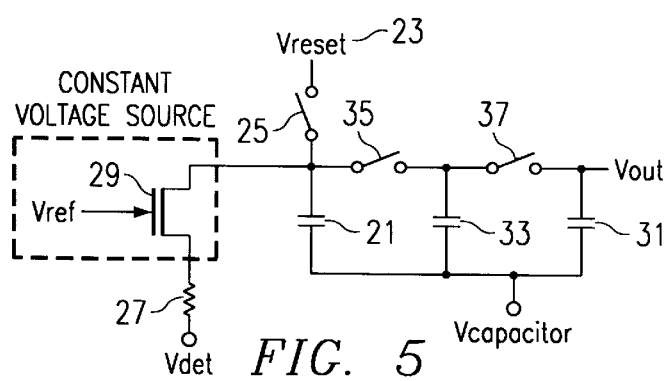
FIG. 5 is a circuit diagram of a pixel sampling circuit, there being one such circuit for each pixel.

To capture a pixel value with a sample-and-hold circuit, as shown in FIG. 5, a capacitor 21 is first charged to a predetermined reference voltage level by a reference voltage source 23 by closure of switch 25 under control of the DSP 8 of FIG. 1b. This capacitor 21 is then switched in series with a pixel resistance 27 ( the same resistor as resistive element 9), the resistance of which changes with temperature, by closure of switch 29 after opening of switch 25. The capacitor 21 discharges through the resistance 27 and, after a controlled amount of discharge time as controlled by the DSP 8, the residual voltage on capacitor 21 is related to temperature through predetermined calibration parameters that are unique per pixel as explained herein since the resistance of resistance element 27 is related to the temperature of that resistive element.

To facilitate capture of the voltage remaining on capacitor 21 for later readout, the voltage remaining on capacitor 21 is ultimately held in the third capacitor 31 of a three-capacitor charge transfer chain. The first or discharge capacitor 21 generates the voltage of interest by discharging through the resistance 27 for the proper amount of time as determined by the DSP 8. The second or transfer capacitor 33 is very small and samples the voltage of the discharge capacitor 21 after switch 29 is again opened and switch 35 is closed. The third or hold capacitor 31 accumulates the charge from the transfer capacitor 33 after opening of switch 35 and closure of switch 37 so that, after many repeated cycles of discharge, transfer and hold, the hold capacitor 31 holds a voltage which is proportional to the average value of the multiple cycles. The hold capacitor 31 voltage can now be read.

The process provides filtering of the data by averaging the individual samples from each cycle. The minimum number of discharge/transfer/hold cycles needed to accurately sample the data is a function of the relative values of the transfer and hold capacitors 33 and 31. The discharge/transfer/hold cycles are necessary when an array of values must be read simultaneously. By transferring the charge to the hold capacitors 31, one for each resistive element 27, the entire array of pixels can be sampled simultaneously. Each value is then available for readout as time permits. This is important if the resistance values represent image data or some other form of data requiring simultaneous sampling.

The time that the discharge capacitor 21 is allowed to discharge through temperature sensitive resistance 27 is predetermined at the DSP 8. This is referred to as the integration time because the capacitor 21 voltage is a function of the elapsed time of discharge, much like an integrator. It is therefore apparent that the resulting voltage on capacitor 21 is dependent upon the integration time as well as the resistance and capacitance values of resistance 27 and capacitor 21. Increasing the integration time reduces the voltage on capacitor 21 whereas decreasing the integration time increases the voltage. Determination of the integration time will now be discussed.

Figure 6:
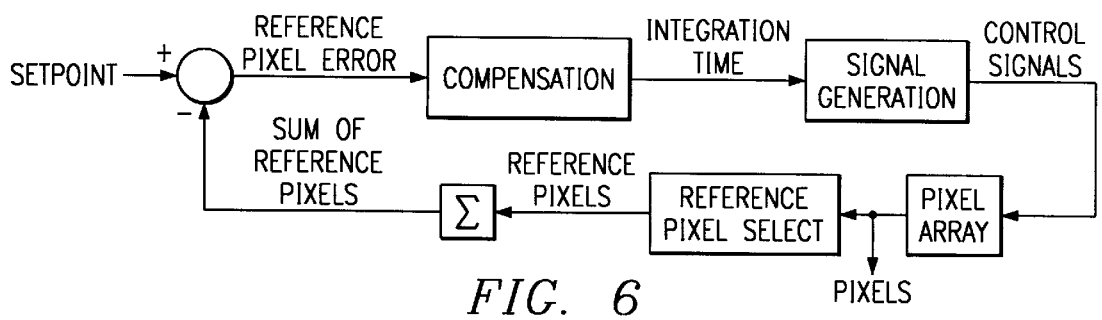
FIG. 6 is a schematic diagram of an integration time loop which is derived from a representative pixel or group of pixels and used to control the variable integration time of the entire set of array pixels.

The desired integration time is the output of a closed loop system as shown in FIG. 6. The pixel 3 resistance 9 (27) values change with temperature, in particular both substrate 5 temperature (the temperature of the substrate carrying the pixels and the electronics) and scene temperature. By making some pixels 3 "blind" to scene temperature (not exposed to scene radiation) and by thermally short circuiting the isolation of these pixels, these pixels become reference pixels, responding only to substrate temperature. Change to the output of each reference pixel is therefore a function only of substrate temperature and integration time. The substrate temperature is not controlled, so the integration time loop of FIG. 6 computes a desired integration time to control the reference pixel data to a predetermined value. In other words, the feedback portion of the integration time loop is the reference pixel data and the control is the integration time. If the reference pixel output is too low, the discharge capacitor 21 was discharged too long so the integration time is decreased. Conversely, if the reference pixel output is too high, the discharge capacitor 21 was not discharged enough so the integration time is increased. The integration time loop of FIG. 6 is necessary for several reasons. It establishes a repeatable operating point or, in other words, the integration time that it takes to drive the reference pixel output voltage as measured in FIG. 5 to the predetermined value at a particular substrate temperature that is unique and repeatable. Since the reference pixel is held at a set point and the rest of the array (blind and non-blind pixels) responds to the substrate temperature in a similar way, the majority of the change in the other pixels will be due to changes in the temperature of the scene. This reduces the required dynamic range of the analog-to-digital converter since most of the effect of a substrate temperature change on the pixel data has been eliminated. Through proper calibration, the pixels can be normalized, based upon integration time. This includes both removing pixel offset and correcting for pixel responsivity. Through proper calibration, the substrate temperature is computed with high accuracy as a function of integration time in the DSP.

The integration time loop of FIG. 6 is a standard integral loop with appropriate compensation. A summing node receives as input a commanded average value for the output from the "blind" pixels and the average of their actual outputs. Based upon the errors formed at the summing node, the servo loop commands an integration time for the array, both "blind" and scene pixels, that corrects the error. Because the characteristics of the scene pixels are very similar to the "blind" pixels, the entire array is run with an optimum integration time and with predictable non-uniformity characteristics. However, the circuit of FIG. 6 has at least one interesting characteristic. A typical plant being controlled will have a limited bandwidth and, when it is controlled digitally, the discrete sampling frequency is selected to be much greater than the plant bandwidth to prevent frequency aliasing when the controller measures the states of the plant. The pixel array is the plant in the integration time control loop of FIG. 6 and has no inherent bandwidth limit. When the integration time changes, the effect is immediate in the next video frame. The bandwidth is limited by the video frame rate, which is not necessarily a function of the pixel array itself. This is an advantage in that the pixel array responds very quickly to integration time changes. It is a disadvantage in that the integration time loop is very sensitive to noise in the reference pixel data.

When relying on a single reference pixel for feedback into the integration time loop, noise is a significant issue. To reduce the noise, several reference pixels are averaged. This introduces no phase loss, as would be the case if the data from a single reference pixel were digitally filtered to reduce noise. Instead, it reduces the noise by assuming that the noise on each of the multiple reference pixels is uncorrelated, which is a valid assumption. This averaging also reduces the effect of quantization introduced by using an n-bit analog-to-digital converter to capture the pixel data in digital form, since the noise in each measurement tends to randomize quantization effects in the average.

The desired integration time resulting from closing the loop based on the reference pixel data is analog (or floating point in a digital processing world). Each integration cycle is characterized by a specific sequence of signals (e.g., a state table) to switch the capacitor banks with the correct timing. In application, this sequence of signals is typically generated with a clock and counter so the quantization of the generated integration time period is limited by the clock frequency. Whether this counter is an actual hardware counter or a count of instruction clocks in a processor or a combination of both (i.e., based on a count of instruction clocks with respect to a hardware timer interrupt in a processor) is irrelevant since the effect is the same. A discretized process with a finite quantization step controls generation of the integration time.

The control loop performance that can be achieved with this time quantization limitation depends upon the speed of the clock and the sensitivity of the reference pixels to the integration time. The speed of the clock can be as fast as required to prevent this from being a problem, if one is willing to pay the cost of faster electronics to handle the clock. The cost can be quite prohibitive so it will be assumed that the clock frequency cannot be made arbitrarily fast. It will also be assumed that the sensitivity of the reference pixels to the integration time is such that the clock is not sufficiently fast by itself to provide the necessary level of control. Quantization time reduction without increasing the clock frequency is discussed hereinbelow.

Since numerous discharge/transfer/hold cycles are executed to make the pixel data available for readout, in the current embodiment, the total number of cycles is based upon the ratio of the transfer 33 and hold 31 capacitor values to yield an accurate sample of the discharge capacitor 21 voltage after the cycles are completed. The number of integration cycles based on this ratio is generally between 100 and 200 in present implementations. To improve the quantization, the integration time for all cycles is not necessarily equal, but rather can switch between the two quantization steps between which the floating point integration time value falls.

If the voltage accumulated from each of the integration cycles is equally weighted in its effect on the resulting pixel voltage, the following scenario is valid:

1. The desired integration time is n+m clock cycles where n is an integer and 0<=m<1. The time represented by n clock cycles is $T_n$. The time represented by n+1 clock cycles is $T_{n+1}$.

2. The total number of integration cycles is i.
3. Compute the switch point, s, as the integration cycle where the switch is made between n and n+1 clock cycles. s=interger(i*(1−m)).
4. Integrate for n clock cycles, s times.
5. Integrate for n+1 cycles, i−s times.

$$\tau_{inj\ execute}^{ideal} = \frac{1}{i}\left(\sum_{j=1}^{s} T_n + \sum_{j=s+1}^{i} T_{n+1}\right)$$

It has been determined that the first integration cycle and the $i^{th}$ integration cycle are not equally weighted in their effect on the pixel data in the above scenario. It is important whether the n-clock cycles come first or last and whether the different length integration cycles are intermixed. In other words, the order of the integration cycles is very important. Regardless of the order, the value of s is not a simple linear relationship as expressed above.

Even though the relationship is not as simple as the above example, the concept is valid. It is possible to develop a relationship that yields s as a function of m that linearly approximates time quantization less than one clock cycle. This relationship can be developed theoretically or can be determined experimentally. The procedure to experimentally determine this relationship is as follows:

1. Run the integration time loop using the linear relationship above to compute s.
2. Assure that the substrate temperature is changing slowly so that n is slowly stepping (it is an integer) and the integration time loop is executed several times for each value of n.
3. Record the values of s while the substrate temperature and n continue to change slowly.
4. Generate a histogram of the values of s with i bins, i.e. one bin for each possible value of s. The peaks of the histogram indicate the values of s that occur more often. This indicates the region within one clock cycle where the reference pixel value is more sensitive to changes in s.
5. Generate the distribution curve of the histogram. This curve increases from 0 to 1 vertically as s increases from 0 to i horizontally.

With this distribution curve available during operation, instead of computing s as a linear function of m, map m onto the vertical axis of the distribution curve and read $s_l$ (linearized) from the horizontal axis. This mapping adjusts the gain in computing s based upon the sensitivity of the reference pixel value to a change in s.

The operating scenario is now changed slightly.

The desired integration time is n+m clock cycles where n is an integer and 0<=m<1. The time represented by n clock cycles is $T_n$. The time represented by n+1 clock cycles is $T_{n+1}$. The total number of integration cycles is i. Compute the linearized switch point, $s_l$, as the integration cycle where the switch is made between n and n+1 clock cycles. $s_l$=mapping of m through the distribution curve. Integrate n clock cycles, $s_l$ times. Integrate for n+1 clock cycles, i−$s_l$ times.

When equal weighting of the integration cycles was assumed, s was computed very simply and $t_{integrate}$ was expressed as the inverse of this computation. When the distribution curve is used to determine $s_l$, the inverse of the computation is not so easily expressed. This is not an implementation problem since it is not necessary to compute $t_{integrate}$ as a function $S_l$ in any event since $t_{integrate}$ is the input to the operation that determines the proper values of n and $s_l$.

$s_l$=linearized switch point=mapping of m through distribution curve $t_{integrate}$=f($T_n$, $T_{n+1}$, i, $s_l$, distribution curve)

This modified scenario for generating the integration time was used while recording s as computed using the linear relationship between m and s from the first scenario. The histogram of s is almost uniform. This indicates that the "subclock" quantization is indeed being realized because the values of m progress uniformly with no apparent preference to specific ranges.

Switching between the two integration times and mapping through the distribution curve results in a significant improvement in the quantization. The quantization improvement is the inverse of the slope of the distribution curve for any value of m. If the distribution curve is linear, the slope is 1/i (distribution changes from 0 to 1 while the switch point changes from 0 to i) for all values of m. In this case, the quantization improvement is uniform by a factor of i and mapping through the distribution curve is unnecessary. If the distribution curve is not linear, the quantization improvement may be different for each value of m. In the current implementation, the quantization ranges from 0.4i to 3i over the full range of switch points.

The above scenarios show integrating for n clock cycles first, then for n+1 clock cycles last. This is not a requirement. These can be interchanged or interlaced in many ways. The important thing is that however the two integration times are mixed while collecting the data to generate the distribution curve, the same procedure must be used after the distribution curve is implemented. Neither way is necessarily better than the other, but each will result in a different distribution curve. Through experimentation, it should be possible to identify the method that results in the greatest minimum quantization improvement. Of course, the greatest minimum quantization improvement realizable is when the distribution curve is linear.

The pixel array is manufactured using standard semiconductor processing techniques and resides on a substrate. The temperature of the substrate affects the data value read from each pixel but the substrate temperature is not measured directly during operation. The integration time loop provides a repeatable operating point for the pixel array and also provides data that can be used to compute the substrate temperature.

Calibration of the substrate temperature with respect to integration time yields data that relates the two variables. During the calibration process, substrate temperature is controlled and the resulting integration time is recorded for several values of substrate temperature. Then, during operation, when substrate temperature is not controlled, substrate temperature is computed based upon the integration time.

The substrate temperature calibration data includes substrate temperature and integration time data pairs. The calibration data is post-processed to determine the best coefficients of a polynomial with a function of integration time as the independent variable. During operation, the function of integration time is then substituted into this polynomial to compute the substrate temperature. The integration time $t_{integrate}$ can be used in place of the function of $t_{integrate}$. The function of $t_{integrate}$ is used as the independent variable to improve the scaling of the polynomial coefficients, $k_i$ and to make the relationship between temperature and the independent variable closer to linear.

$$\text{temperature}_{substrate} = \sum_{i=0}^{n} \{k_i [f(t_{integrate})]\}$$

Calibration of substrate temperature with respect to integration time is accomplished by controlling the ambient (substrate) temperature and recording the resulting integration time. At the same time, the raw data from each pixel of the array is recorded, resulting in an array of raw pixel data at each temperature. Each pixel must be calibrated in both offset and gain (responsivity). This calibration data is then used during operation to remove the offset and correct the gain in real-time.

The offset calibration data comprises an array of raw pixel data at each substrate temperature. The scene, i.e., what the pixels actually see, is the same temperature as the substrate at each of these data points. With this condition, any variation between pixels and over temperature is due to each pixel's nominal resistance value and how it changes over temperature with respect to the reference pixels. Since all pixels see the same temperature and the substrate is isothermal, the goal is to compute a value that when subtracted from the raw pixel data, yields zero. In other words, zero means that the scene being viewed by that pixel is the same temperature as the substrate. Note that no reference is made to the actual temperature of the pixel itself, within the array, but rather to the scene and substrate temperatures. The temperature of each pixel is slightly elevated above the substrate temperature due to self-heating from the bias current. This temperature component is automatically accounted for in the offset calibration as part of the offset correction that is subtracted from the raw pixel data, however the self-heating must be stable for the calibration to be stable.

Given the set of offset calibration data arrays and corresponding integration times, the data is post-processed to yield the best coefficients of a polynomial with a function of integration time as the independent variable. This is very similar to the substrate temperature polynomial and uses the same function of integration time. In this case, however, there is a set of polynomial coefficients for each pixel of the array.

$$\text{offset corrected pixel}_j = \text{raw pixel}_j - \sum_{i=0}^{n} \{k_{1.j} * [f(t_{integrate})]\}$$

This set of offset polynomial coefficients is then loaded back into the pixel control hardware for use, real-time, to offset correct the raw pixel data as it is read. A different set of coefficients is used for each pixel but the independent variable values are the same for the entire pixel array since the integration time applies to all pixels. The resulting data array after offset correction indicates whether the portion of the scene viewed by each pixel is warmer or cooler than the substrate temperature, regardless of the actual substrate temperature.

At this point, the pixel data indicates whether each pixel is "seeing" a temperature cooler or warmer than the substrate. The magnitude of that temperature difference is not yet known because each pixel responds to the scene temperature differently. So far, all calibration data has been collected with the substrate and the scene at the same temperature but to calibrate the responsivity of each pixel, the scene temperature must be different from that of the substrate.

The data required to calibrate and then correct each pixel for responsivity is collected as a matrix of substrate and scene temperatures. The range of substrate temperatures should encompass the expected operating temperature range. The range of scene temperatures should encompass the expected scene temperature range. If the operating scene temperature actually exceeds this range, the correction can be extrapolated but may result in degraded performance.

The offset correction for each pixel is a function of the integration time. This results in an offset corrected value for each pixel. Nominally, it should just be necessary to multiply this offset corrected value by a constant for each pixel to correct for responsivity. Unfortunately, responsivity is not constant over temperature. Instead, the responsivity is dependent on the substrate temperature, the scene temperature and the self-heating due to the bias current. Again, assuming that the self-heating is stable in the presence of specific substrate and scene temperatures, the responsivity is a function of both integration time (substrate temperature) and the offset corrected pixel value (relative scene temperature). Using collected data, the responsivity correction is developed as a function of both integration time and the offset corrected pixel value, yielding scene temperature.

These computations must be performed in real time, so a simplifying assumption can be made if processor loading is a concern. Rather than making the responsivity correction a function of both integration time and the offset corrected pixel value, the computations can be split into two steps. The correction is made a polynomial function of the offset corrected pixel value. The polynomial coefficients can be developed as functions of $t_{integrate}$, i.e., assume that responsivity is a function of substrate temperature and ignore the effect of scene temperature on responsivity.

$$\text{responsivity corrected pixel}_j = \sum_{i=0}^{n} \{k_{i,j}(t_{integrate}) * [\text{offset corrected pixel}_j]\}$$

where: $k_{Ij}(I_{integrate})$=polynomial coefficients for $j^{th}$ pixel as a function of $t_{integrate}$.

An additional assumption greatly enhances the computational throughput at the expense of coefficient storage capacity. A set of polynomial coefficients is computed for each of several substrate temperatures. During operation, the set of coefficients corresponding to the temperature closest to the current substrate temperature is used in performing the responsivity correction. The selection of the correct coefficient set must be performed only once per scene.

$$\text{responsivity corrected pixel}_j = \sum_{i=0}^{n} \{k_{1.j,tint} * [\text{offset corrected pixel}_j]\}$$

where: $k_{Ij,tint}$=polynomial coefficients for $j^{th}$ pixel while $t_{integrate}$≈tint The final step is now to compute the absolute temperature of the scene for each pixel. This is accomplished by adding the substrate temperature to each responsivity corrected pixel data element as follows:

Scene temperature$_j$=substrate temperature+responsivity corrected pixel$_j$.

Though the invention has been described with reference to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A method for calibrating a detector and measuring the temperature of a scene which comprises the steps of:
   (a) providing a detector having a plurality of pixels, at least one of said pixels being a reference pixel, and providing an integratable sampling circuit associated with each of said pixels;
   (b) observing an ambient reference temperature with said at least one reference pixel to provide a parameter indicative of the ambient reference temperature observed and providing a constant voltage output indicative of said ambient reference temperature observed by varying an integration time of said integratable sampling circuit;
   (c) carrying out a calibration procedure which includes exposing other said pixels of said detector to a plurality of different scene temperatures and ambient temperatures and recording for each of said other pixels the integration time associated with each set of data at each ambient temperature and scene temperature;
   (d) determining a voltage level and a value of said integration time for each of said pixels;
   (e) calculating an offset correction for each said pixel based upon the integration time from an equation therefor;
   (f) applying the offset correction to a pixel value for each said pixel;
   (g) calculating an ambient temperature based upon the integration time;
   (h) calculating a temperature difference between the ambient temperature and the scene temperature for each said pixel based upon a responsivity corrected pixel value using a scale factor determined during said calibration procedure; and
   (i) adding the ambient temperature and the difference between the ambient temperature and the scene temperature to obtain the actual scene temperature.

2. The method of claim 1 wherein said detector includes a plurality of said reference pixels and wherein said step of providing a constant voltage output indicative of said ambient reference temperature observed is carried out by setting said constant voltage as a function of an average of said plurality of reference pixels.

3. The method of claim 1 wherein said step of carrying out said calibration procedure further includes the steps of providing an equation for each said pixel that relates the integration time to the pixel value when the ambient temperature and the scene temperature are the same to be used for correction of offsets; providing an equation for each of said other pixels relating the integration time and the offset corrected pixel value to the difference between the ambient temperature and the scene temperature when the ambient temperature and the scene temperature are different for correction of responsivity; and providing an equation relating the integration time to the ambient temperature for calculating the ambient temperature.

4. The method of claim 2 wherein said step of carrying out said calibration procedure further includes the steps of providing an equation for each said pixel that relates the integration time to the pixel value when the ambient temperature and the scene temperature are the same to be used for correction of offsets; providing an equation for each of said other pixels relating the integration time and the offset corrected pixel value to the difference between the ambient temperature and the scene temperature when the ambient temperature and the scene temperature are different for correction of responsivity; and providing an equation relating the integration time to the ambient temperature for calculating the ambient temperature.

5. The method of claim 1 further including the step of calculating the responsivity corrected value for each said pixel based upon the integration time and the offset corrected pixel value.

6. The method of claim 2 further including the step of calculating the responsivity corrected value for each said pixel based upon the integration time and the offset corrected pixel value.

7. The method of claim 3 further including the step of calculating the responsivity corrected value for each said pixel based upon the integration time and the offset corrected pixel value.

8. The method of claim 4 further including the step of calculating the responsivity corrected value for each said pixel based upon the integration time and the offset corrected pixel value.

9. The method of claim 1, wherein the method for controlling integration time includes the steps of:
   operating an integration time loop using a linear relationship to compute a value s;
   assuring that the integration time loop is executed a plurality of times for each value of a parameter n;
   recording the values of s;
   generating a histogram of the values of s;
   generating a distribution curve of the histogram; and
   mapping m onto the vertical axis of the distribution curve and reading $s_f$ from the horizontal axis to adjust a gain in computing s based upon a sensitivity of the reference pixel value to a change in s;
   where s=integer(i*(1−m)), i is the total number of integration cycles, n is an integer, 0<=m<1 and the desired integration time is n+m clock cycles.

10. The method of claim 2, wherein the method for controlling integration time includes the steps of:
    operating an integration time loop using a linear relationship to compute a value s;
    assuring that the integration time loop is executed a plurality of times for each value of a parameter n;
    recording the values of s;
    generating a histogram of the values of s;
    generating a distribution curve of the histogram; and
    mapping m onto the vertical axis of the distribution curve and reading $s_f$ from the horizontal axis to adjust a gain in computing s based upon a sensitivity of the reference pixel value to a change in s;
    where s=integer(i*(1−m)), i is the total number of integration cycles, n is an integer, 0<=m<1 and the desired integration time is n+m clock cycles.

11. The method of claim 3, wherein the method for controlling integration time includes the steps of:
    operating an integration time loop using a linear relationship to compute a value s;
    assuring that the integration time loop is executed a plurality of times for each value of a parameter n;
    recording the values of s;
    generating a histogram of the values of s;
    generating a distribution curve of the histogram; and mapping m onto the vertical axis of the distribution curve and reading $s_f$ from the horizontal axis to adjust a gain in computing s based upon a sensitivity of the reference pixel value to a change in s;

where s=integer(i*(1−m)), i is the total number of integration cycles, n is an integer, 0<=m<1 and the desired integration time is n+m clock cycles.

12. The method of claim 4, wherein the method for controlling integration time includes the steps of:

operating an integration time loop using a linear relationship to compute a value s;

assuring that the integration time loop is executed a plurality of times for each value of a parameter n;

recording the values of s;

generating a histogram of the values of s;

generating a distribution curve of the histogram; and mapping m onto the vertical axis of the distribution curve and reading $s_f$ from the horizontal axis to adjust a gain in computing s based upon a sensitivity of the reference pixel value to a change in s;

where s=integer(i*(1−m)), i is the total number of integration cycles, n is an integer, 0<=m<1 and the desired integration time is n+m clock cycles.

13. The method of claim 5, wherein the method for controlling integration time includes the steps of:

operating an integration time loop using a linear relationship to compute a value s;

assuring that the integration time loop is executed a plurality of times for each value of a parameter n;

recording the values of s;

generating a histogram of the values of s;

generating a distribution curve of the histogram; and mapping m onto the vertical axis of the distribution curve and reading $s_f$ from the horizontal axis to adjust a gain in computing s based upon a sensitivity of the reference pixel value to a change in s;

where s=integer(i*(1−m)), i is the total number of integration cycles, n is an integer, 0<=m<1 and the desired integration time is n+m clock cycles.

14. The method of claim 6, wherein the method for controlling integration time includes the steps of:

operating an integration time loop using a linear relationship to compute a value s;

assuring that the integration time loop is executed a plurality of times for each value of a parameter n;

recording the values of s;

generating a histogram of the values of s;

generating a distribution curve of the histogram; and mapping m onto the vertical axis of the distribution curve and reading $s_f$ from the horizontal axis to adjust a gain in computing s based upon a sensitivity of the reference pixel value to a change in s;

where s=integer(i*(1−m)), i is the total number of integration cycles, n is an integer, 0<=m<1 and the desired integration time is n+m clock cycles.

15. The method of claim 7, wherein the method for controlling integration time includes the steps of:

operating an integration time loop using a linear relationship to compute a value s;

assuring that the integration time loop is executed a plurality of times for each value of a parameter n;

recording the values of s;

generating a histogram of the values of s;

generating a distribution curve of the histogram; and mapping m onto the vertical axis of the distribution curve and reading $s_f$ from the horizontal axis to adjust a gain in computing s based upon a sensitivity of the reference pixel value to a change in s;

where s=integer(i*(1−m)), i is the total number of integration cycles, n is an integer, 0<=m<1 and the desired integration time is n+m clock cycles.

16. The method of claim 8, wherein the method for controlling integration time includes the steps of:

operating an integration time loop using a linear relationship to compute a value s;

assuring that the integration time loop is executed a plurality of times for each value of a parameter n;

recording the values of s;

generating a histogram of the values of s;

generating a distribution curve of the histogram; and mapping m onto the vertical axis of the distribution curve and reading $s_f$ from the horizontal axis to adjust a gain in computing s based upon a sensitivity of the reference pixel value to a change in s;

where s=integer(i*(1−m)), i is the total number of integration cycles, n is an integer, 0<=m<1 and the desired integration time is n+m clock cycles.

* * * * *

UNITED STATES PATENT AND TRADEMARK OFFICE
CERTIFICATE OF CORRECTION

PATENT NO. : 6,267,501 B1
DATED : July 31, 2001
INVENTOR(S) : Martin A. Wand et al.

It is certified that error appears in the above-identified patent and that said Letters Patent is hereby corrected as shown below:

Column 3,
Line 13, after "$T_n$", delete ",", and insert -- . --.

Column 5,
Line 10, after "invention", delete ".", and insert -- ; --.

Column 9,
Line 59, after "Integrate", insert -- for --.

Column 10,
Line 1, after "function", delete "$S_l$", and insert -- $s_I$ --.

Column 12,
Line 52, after the portion of the formula that reads {$k_{1,j}$, delete "$t_{int}$" and insert -- $t_{integrate}$ --.
Line 57, after "$k_{Ij}$", delete "$t_{int}$", and insert -- $t_{integrate}$ --.

Column 13,
Lines 43 and 49, after "claim 1", insert -- , --.
Line 62, after "claim 2", insert -- , --.

Signed and Sealed this

Twenty-sixth Day of March, 2002

*Attest:*

*Attesting Officer*

JAMES E. ROGAN
*Director of the United States Patent and Trademark Office*